United States Patent [19]

Ritter et al.

[11] Patent Number: 5,846,601
[45] Date of Patent: Dec. 8, 1998

[54] USE OF SELECTED POLYVINYL ACETATE DISPERSIONS FOR THE SURFACE STABILIZATION OF SAND AND/OR SOIL

[75] Inventors: Wolfgang Ritter, Haan; Stephan von Tapavicza, Erkrath; Heinz Müller, Monheim; Hartmut Büsching, Raddestorf, all of Germany

[73] Assignee: Henkel Kommanditgesellschaft auf Aktien, Duesseldorf, Germany

[21] Appl. No.: 583,081

[22] PCT Filed: Jul. 12, 1994

[86] PCT No.: PCT/EP94/02284

§ 371 Date: Mar. 4, 1996

§ 102(e) Date: Mar. 4, 1996

[87] PCT Pub. No.: WO95/03372

PCT Pub. Date: Feb. 2, 1995

[30] Foreign Application Priority Data

Jul. 21, 1993 [DE] Germany .......................... 43 24 474.2

[51] Int. Cl.$^6$ ...................................................... B05D 7/00
[52] U.S. Cl. ................ 427/221; 106/273.1; 106/287.22; 106/287.23; 106/900; 405/264; 71/903; 427/136; 523/131; 523/132; 524/52; 524/313; 524/310; 524/109; 524/114
[58] Field of Search .............................. 405/264; 523/131, 523/132; 524/52, 313, 310, 109, 114; 406/273.1, 287.22, 287.23; 106/900; 71/903; 427/136, 221

[56] References Cited

U.S. PATENT DOCUMENTS

| | | | |
|---|---|---|---|
| 2,628,948 | 2/1953 | Kunze et al. | 524/310 |
| 3,033,808 | 5/1962 | Murray et al. | 524/313 |
| 3,524,828 | 8/1970 | Keithley | 524/313 X |
| 3,540,580 | 11/1970 | Columbus et al. | 524/313 X |
| 3,620,899 | 11/1971 | Kelley et al. | 524/52 X |
| 3,640,021 | 2/1972 | Grafmuller | 47/9 |
| 3,651,649 | 3/1972 | Najvar et al. | 525/524 X |
| 3,690,107 | 9/1972 | Dolfing et al. | 61/36 R |
| 3,736,758 | 6/1973 | Dolfing et al. | 61/36 R |
| 3,887,506 | 6/1975 | Hewitt | 260/17 |
| 3,926,889 | 12/1975 | Duchesneau et al. | 260/29.6 PM |
| 3,949,145 | 4/1976 | Otey et al. | 524/52 X |
| 3,979,305 | 9/1976 | Fischer et al. | 523/132 X |
| 3,989,632 | 11/1976 | Fischer et al. | 523/131 X |
| 4,015,970 | 4/1977 | Hennart | 71/11 |
| 4,072,020 | 2/1978 | Revetex | 61/36 |
| 4,110,466 | 8/1978 | Inoue et al. | 424/274 |
| 4,243,563 | 1/1981 | Ferm | 427/136 X |
| 4,440,896 | 4/1984 | Schuppiser et al. | 524/458 |
| 4,544,689 | 10/1985 | Ehmann et al. | 524/52 |
| 4,575,391 | 3/1986 | DeBoodt et al. | 71/28 |
| 4,663,067 | 5/1987 | Mallow et al. | 252/88 |
| 4,956,404 | 9/1990 | Pelzig | 524/48 |
| 5,098,718 | 3/1992 | Ardaillon et al. | 426/2 |
| 5,326,572 | 7/1994 | Mehra et al. | 424/484 |
| 5,342,872 | 8/1994 | Huber | 428/294 |

FOREIGN PATENT DOCUMENTS

| | | |
|---|---|---|
| 52-040540 | 3/1977 | Japan . |
| 55-016074 | 2/1980 | Japan . |
| 56-161462 | 12/1981 | Japan . |
| 7501787 | 3/1975 | South Africa . |
| 906470 | 9/1962 | United Kingdom . |

OTHER PUBLICATIONS

A. Kullman et al., Archiv für Acker—und Pflanzenbau Bodenkunde, vol. 22, No. 11 (1978), pp. 713 to 719 (Chemical Abstract 91 (5): 38081u).

D. Gabriels et al., Soil Science, vol. 118, No. 5 (1974), pp. 332 to 338 (Chemical Abstracts 82 (15): 96945d).

Z. Szamoskozi et al., Szabadalmi Közlöny 81. ÉVF. 1976 ÉV, p. 478 (Chemical Abstracts 85 (21): 158730c(= HU–A–11 654)).

H. Kastien et al., "Der quantitative mikrobiologische Abbau von Lackkunstharzen und Polymerdispersionen (The Quantitative Microbiological Degradation of Paint–Grade Resins and Polymer Dispersions)", Farbe+ lack, vol. 98, Jul./1992, pp. 505–508.

D. F. Anderson, et al., U.S. Nat. Tecn. Inform. Serv., AD Rep., No. 732484, Avail. NTIS; Govt. Rep. Announce, (U.S.) 1972, 72 (1), 75 (Chemical Abstracts 76 (24):141689n).

Primary Examiner—Judy M. Reddick
Attorney, Agent, or Firm—Wayne C. Jaeschke; Daniel S. Ortiz; John Daniel Wood

[57] ABSTRACT

A method for the surface stabilization of sand and/or soil is provided. The method is comprised of applying an aqueous polymer dispersion to the surface layer of soil. The aqueous polymer dispersion is comprised of triesters of glycerol with lower aliphatic monocarboxylic acids, citric acid triesters with lower aliphatic monohydric alcohols and/or epoxidized triglycerides of at least partly olefinically unsaturated fatty acids as biodegradable plasticizers in aqueous polyvinyl acetate dispersions.

31 Claims, No Drawings

USE OF SELECTED POLYVINYL ACETATE DISPERSIONS FOR THE SURFACE STABILIZATION OF SAND AND/OR SOIL

BACKGROUND OF THE INVENTION

1. Field of the Invention

This invention relates to the surface stabilization of sand and/or soil, hereinafter generally referred to as soil, by application and introduction of an aqueous polymer dispersion to and into surface layers of soil. The water in the impregnating composition introduced dries in a comparatively short time and the polymer phase remaining behind solidifies the structure, for example the granular structure, of the impregnated soil without unduly affecting the permeability of these layers to water. Surface stabilization such as this is not confined to soil in the narrower sense. The corresponding stabilization of other surface zones which have to be protected, for example, against wind erosion falls within the scope of the teaching according to the invention. Examples of such surface zones include spoil banks with or without application of a covering of top soil or the like.

2. Discussion of Related Art

Development and practice have been concerned for decades with the concept—on which the present invention is also based—of applying synthetic polymers which cause particulate solids to adhere to one another to the surfaces to be stabilized in the form of aqueous dispersions or emulsions and leaving them to dry thereon. Aqueous polyvinyl acetate dispersions, hereinafter also referred to as PVAc dispersions, are of particular significance in this regard, cf. A. Kullmann et al. in Archiv für Acker- und Pflanzenbau und Bodenkunde, Vol. 22, No. 11 (1978), pages 713 to 719 (Chemical Asbtracts 91 (5): 38081u). Besides polyvinyl acetate, butadiene/styrene latex, a urea/formaldehyde polymer and a bitumen emulsion are described as useful binders. The corresponding stabilization of dune sand against the effects of rain is the subject of an article by D. Gabriels et al. in Soil Science, Vol. 118, No. 5 (1974), pages 332 to 338 (Chemical Abstracts 82 (15): 96945d). In this publication, too, a binder system based on polyvinyl acetate is included among the preferred binders. U.S. Pat. No. 4,072,020, U.S. Pat. No. 3,887,506, Chemical Abstracts 85 (21): 158730c (=HU-A-11 654) and ZA-A-7501787 are mentioned as examples of the other works being carried out worldwide.

The list of requirements or functions to be fulfilled by corresponding stabilization of the earth's surface can be extremely diverse. Without any claim to completeness, some of the properties required in practice are mentioned in the following: the material should be resistant at least to pedestrian traffic, it should not be affected by the particular temperatures prevailing, atmospheric humidity or rain (for the period envisaged) and should also be resistant to high wind speeds. The material to be applied should be non-inflammable and should not represent a fire or explosion risk either in storage or during and after its application. Its transport and application should not entail any exceptional protective measures or the wearing of protective clothing. The cured polymer impregnation should not have any toxic effect on germinating plants, on growing plants or on animals and should be colorless or transparent. Taking these and other requirements into account, the present state of the art may be summarized as follows:

1. PVAc homopolymer dispersions are basically suitable as binders. In the absence of plasticizers, however, the cohesion of the soil layers impregnated with PVAc homopolymer dispersions is so brittle that key application requirements are not satisfied.

2. The deficiency mentioned in (1) can be eliminated by using plasticizers capable of flow under normal conditions. In practice, dibutyl phthalate has proved to be a particularly effective plasticizer. Correspondingly plasticized PVAc homopolymers provide for firm cohesion although the plasticizer is non-degradable.

3. Internally plasticized polymer dispersions (polyvinyl acetate co-dibutyl maleate) provide for firm cohesion but are also non-degradable.

The problem addressed by the present invention was to provide PVAc homopolymer dispersions for the described application with plasticizers which, on the one hand, would meet the wide-ranging requirement profile, but which on the other hand would be biologically safe and, in particular, degradable. The teaching in question is based on the knowledge that, basically, PVAc homopolymers are biologically safe and degradable even though degradation of this polymer is comparatively slow. The relevant literature is represented, for example, by H. Kastien et al. "Der quantitative mikrobiologische Abbau von Lack-kunstharzen und Polymerdispersionen (The Quantitative Microbiological Degradation of Paint-Grade Resins and Polymer Dispersions)", farbe+lack, Vol. 98, 7/1992, pages 505–508. Accordingly, the problem addressed by the invention in the narrower sense is to provide hitherto unknown combinations of PVAc homopolymer dispersions and "biocompatible" plasticizers which would meet the wide-ranging technical requirement profile of soil stabilization, but which at the same time would as a whole undergo the natural degradation processes. Thereafter, the continuing stabilization of the surface layers in question can take place in known manner through plant growth processes occurring in the meantime, so that the initially applied and immediately effective synthetic stabilization of the surface layers is taken over by the now sufficiently advanced plant growth processes, the synthetic initial aid ultimately disappearing completely under the effect of natural degradation processes.

Although biologically acceptable plasticizers for PVAc dispersions are basically known per se, their use in accordance with the invention in such combinations for stabilizing surface layers of soil is not known. The relevant literature on plasticizer modification in PVAc polymers where they are used in the field of soil stabilization shows that it is not possible to make sufficiently reliable assertions on the fulfilment of the wide-ranging requirement profile in view of the change of plasticizer, cf. the Article by D. F. Anderson et al., U.S. Nat. Techn. Inform. Serv., AD Rep., No. 732484, Avail. NTIS; Govt. Rep. Announce, (U.S.) 1972, 72 (1), 75 (Chemical Abstracts 76 (24):141689n). Starting out from the basically satisfactory combination of PVAc homopolymer with dibutyl phthalate as plasticizer, attempts are made to establish universally satisfactory product properties using a number of other plasticizer components known per se. Even in regard to the basic requirement of adequate elasticity of the film, success is only achieved in the special case where plasticizers based on oligoethylene glycol derivatives are used. The other plasticizers investigated in the document cited above all lead to unacceptable embrittlement of the PVAc film.

The teaching according to the invention as described in the following is based on corresponding test results. From the basically large class of useful materials with plasticizer properties, particularly those based on natural substances, only three representatives have proved to be useful auxiliaries in the context of the problem addressed by the present invention.

SUMMARY OF THE INVENTION

Accordingly, the present invention relates to the use of triesters of glycerol with lower aliphatic monocarboxylic acids, to the use of citric acid triesters with lower aliphatic monohydric alcohols and/or to the use of epoxidized triglycerides of at least partly olefinically unsaturated fatty acids as biologically degradable plasticizers in aqueous polyvinyl acetate dispersions where they are used for the surface stabilization of sand and/or soil.

DETAILED DESCRIPTION OF THE INVENTION

Three types of low molecular weight plasticizers based on natural materials have proved to be suitable for satisfying the requirement profile according to the invention.

The first group comprises triesters of glycerol with lower aliphatic monocarboxylic acids. Corresponding glycerol triesters of aliphatic monocarboxylic acids containing 2 to 6 carbon atoms and, more particularly, 2 to 4 carbon atoms in the molecule are particularly suitable. A particularly important representative is triacetin. The studies on which the present invention is based have shown that even very small additions of triacetin to the PVAc homopolymer are sufficient to soften the PVAc film to an extent sufficient for the application according to the invention, so that the sand or soil formations impregnated with this mixture and solidified through drying of the water originally introduced do not become brittle and, hence, may be walked on for example.

The second group of plasticizers suitable for use in accordance with the invention is represented by citric acid triesters. The citric acid may be present as such and also in the form of the variant acylated at its hydroxyl group. Suitable ester-forming alcohols for the reaction with the carboxyl groups of the citric acid are, in particular, monohydric aliphatic alcohols containing 2 to 6 carbon atoms and preferably corresponding alcohols containing 2 to 4 carbon atoms. Both in this class of compounds and in the above-mentioned class of glycerol triesters with aliphatic monocarboxylic acids, the volatility and hence the boiling temperature of the plasticizer component can be influenced through the choice of the chain length of the particular monofunctional component used for the esterification process. In the case of the citric acid esters, further variation is possible through the chain length of the acyl group optionally attached to the hydroxyl group of the citric acid. Corresponding residues of monobasic, more particularly saturated, carboxylic acids containing 2 to 10 carbon atoms and, optionally, residues of corresponding acids containing an even larger number of carbon atoms are suitable for this purpose. The teaching according to the invention enables a possible loss of plasticizer under extreme conditions, for example in bright sunlight, and hence embrittlement of the films formed to be limited.

The third class of plasticizers in the context of the teaching according to the invention is represented by the epoxidized triglycerides of at least partly olefinically unsaturated fatty acids. The most important representatives of this class on practical and economic grounds are epoxidized rapeseed oil and epoxidized soybean oil which are marketed and proposed as commercial products for a variety applications, for example by the applicants. This sub-class of the plasticizers used in accordance with the invention clearly reflects the selection character of the teaching according to the present invention: triglyceride esters of saturated and/or unsaturated fatty acids, more particularly corresponding triglycerides of natural origin which are present as oils under normal conditions, do not have an adequate plasticizing effect in admixture with PVAc homopolymers. Unexpectedly, the epoxidation of at least partly olefinically unsaturated triglycerides of this type and, more particularly, the epoxidation of rapeseed oil provides a plasticizer which meets the complex list of requirements, fulfils the conditions imposed here and, at the same time, undergoes natural degradation processes as a natural substance.

The quantity of plasticizer needed to meet the requirement profile in the dispersions used in accordance with the invention is limited. In general, quantities of plasticizer of around 1 to 15% by weight and, preferably, around 3 to 10% by weight (based on the approximately 50% by weight PVAc homopolymer dispersion) produce adequate results. Additions of around 5 to 8% by weight of plasticizer can be particularly important. An advantage of the teaching according to the invention which has already been discussed is clearly apparent here: a partial elimination of plasticizer occurring under extreme conditions, for example sunlight, does not have a directly adverse effect on the properties of the dried PVAc film in admixture with the stabilized soil. Even in the event of comparatively extensive elimination of plasticizer from the impregnation, the stabilized layer is still guaranteed adequate flexibility. The structural similarity of the plasticizer molecule to the structural unit of the PVAc homopolymer may possibly have a positive effect in this regard to the extent that the desired effect is maintained, even at low plasticizer concentrations, through the particularly deep penetration of the plasticizer into the polymer molecule.

The PVAc dispersions to be used in practice are the known aqueous preparations with PVAc solids contents of, for example, around 10 to 65% by weight and preferably in the range from about 35 to 60% by weight. Hitherto, aqueous PVAc dispersions have often been applied with corresponding solids contents of 50 to 60% by weight. In principle, use can also be made of this in the context of the teaching according to the invention.

In one particularly preferred embodiment, other additives of the aqueous impregnating and binding compositions selected in accordance with the invention are also biodegradable and hence biocompatible. This particular embodiment of the invention is characterized by the use of biodegradable protective colloids for stabilizing the aqueous PVAc dispersions. Suitable protective colloids are, on the one hand, polyvinyl alcohol and, on the other hand, starch and/or water-soluble starch derivatives; the starch may even be subjected to a partial reduction in molecular weight. However, where starch and/or water-soluble starch derivatives in particular are used as the protective colloids, the use of excessive quantities of these water-soluble components can endanger the stability of the film against erosion under the effect of rain and hence can lead to overly rapid degradation of the film. In a preferred embodiment of the invention, therefore, the quantities in which the protective colloids or rather emulsifiers are used are limited to such an extent that the PVAc film remains sufficiently resistant to the effects of weathering. The quantities in which the protective colloids or rather emulsifiers are normally used are at most around 5% by weight and, more particularly, in the range from about 0.5 to 3% by weight, based on the PVAc solids.

As for the rest, the technical elements developed in the relevant prior art for the formation of corresponding surface films may also be utilized in the context of the teaching according to the invention. For example, reference is made in this regard to the use of growth-promoting active substances, more particularly fertilizing auxiliaries, and/or to the use of preferably fine-particle solids, more particularly in the aqueous preparation of the impregnating composition.

In the last-mentioned case, it is known that the prior art provides in particular for the use of fine-particle solids based on natural materials, such as sawdust, straw particles, cereal husks, coconut and/or flax fibers and the like, in order in this way to ensure the formation of local openings for further promoting plant growth without endangering the overall cohesion of the solidified layer. The soil-stabilizing aqueous active-substance preparation may be applied in known manner with plant seeds. However, the corresponding treatment of the soil may also take place independently of stabilization before or after application of the aqueous PVAc-based preparation according to the invention. The quantity of aqueous suspension applied is determined by a number of factors, including—purely by way of example—the penetrability of the upper soil layer, the desired objective and, in particular, the duration of the stabilizing effect and the weather-induced influences expected over the period for which sufficiently firm cohesion of the stabilized surface soil layers is to be guaranteed. In general, the depth of penetration of the aqueous PVAc dispersion into the soil will be at most a few centimeters, depths of penetration of around 0.5 to 3 cm and, more particularly, around 1 to 2 cm normally being sufficient. In many cases, however, soil stabilization to a depth of less than 1 cm is also entirely sufficient.

EXAMPLES

Using a commercially available PVAc dispersion (approx. 50% by weight)—VP 4239/278 B (protective colloid polyvinyl alcohol), a product of Cordes—mixtures with 5% by weight and 10% by weight—based on the aqueous dispersion—of the plasticizers listed below are prepared as follows:

Preparation of the dispersions

The plasticizer is added to the dispersion with stirring at room temperature, followed by stirring for 10 minutes.
Condition IKA stirrer with paddle stirrer, r.p.m.=900 $\min^{-1}$ The plasticizer-containing dispersions are applied as films and the dried films are evaluated.
Production of the films The dispersion/plasticizer mixture is knife-coated onto a Teflon plate (in the case of the glycerol-containing mixtures, the film was applied to polyethylene). The films are dried at room temperature.
Condition coating knife=400 $\mu$m Drying time: 4–6 h The following plasticizers were used:

1) triacetin
2) acetyl butyl ricinoleate
3) rapeseed oil fatty acid methyl ester
4) ricinene fatty acid methyl ester
5) glycerol
6) triethyl citrate
7) acetyl triethyl citrate
8) tributyl citrate
9) rapeseed oil
10) rapeseed oil ethylhexyl ester
11) epoxidized soybean oil (commercial product EDENOR D 81).

The films formed with these plasticizers are evaluated for flexibility, solubility in water and cohesion. The dispersion mixture used is tested for stability and homogeneity after standing for more than 14 days.

Useful results in the context of the teaching according to the invention are only obtained where the following plasticizers are used:

1) triacetin
6) triethyl citrate
7) acetyl triethyl citrate
8) tributyl citrate
11) epoxidized soybean oil.

The stability and homogeneity of the dispersion mixtures according to the invention after more than 14 days are very good both where 5% by weight of plasticizer and where 10% by weight of plasticizer is added.

In no case is the dried film soluble in water. Where the plasticizers are added in quantities of 10% by weight, the films are all evaluated as "very flexible". They are also "very flexible" in the case of acetyl triethyl citrate added in a quantity of 5% by weight. In every other case, the addition of 5% by weight produces a flexibility evaluation of "flexible".

The cohesion of the films is very good in every case. Where 10% by weight of plasticizer is added and, in the case of acetyl triethyl citrate, even where 5% by weight is added, the film can be forcibly stretched before tearing. The addition of 5% by weight of the other plasticizers produces such cohesion that the film only tears under considerable force.

Sand layers can be stabilized with the aqueous PVAc dispersions containing plasticizers corresponding to the definition according to the invention in such a way that they are resistant to weathering and can be walked on.

Application Examples

1) Stabilization of sand surfaces

The above-mentioned PVAc dispersion VP4239/278B containing various plasticizers added in various quantities was used in surface stabilization tests on sand samples. PVAc dispersions with the following additions were used:

1.1) no added plasticizer (comparison test)
1.2) 2% by weight of triacetin
1.3) 5% by weight of triacetin
1.4) 10% by weight of triacetin
1.5) 10% by weight of epoxidized soybean oil (EDENOR D81)
1.6) 10% by weight of dibutyl phthalate (comparison test).

The tests were carried out as follows:

The surfaces of identical sand samples were treated with identical quantities of 10% by weight solutions of the dispersions mentioned above. The particular hardening time required was then determined at ambient temperature (around 20° to 25° C.). Result: no significant differences between the individual samples were observed. All the samples required a hardening time of more than 16 hours.

In addition, the water absorption capacity and surface elasticity of the hardened samples were investigated and visually compared. Once again, there were no significant differences between the individual samples.

The test described above were repeated using a 5% by weight solution of the above-mentioned dispersions. So far as the particular surface hardness of the individual samples was concerned, those samples which had been obtained with dispersions containing added triacetin showed generally better behavior, i.e. the overall stabilization of the sand surfaces was stronger. Slight differences were observed in the surface elasticity of the samples obtained with formulations 1.2 and 1.3 (2% and 5% by weight of added triacetin)

and the sample obtained with formulation 1.4 (10% by weight of added triacetin).

2) Testing of weather influences on stabilized sand surfaces

For these tests, the above-mentioned PVAc dispersions with an addition of 5% by weight of triacetin were used in the form of 10% by weight solutions. Metal trays filled with 1500 g of sand in a layer thickness of around 3 to 4 cm were used as the test surfaces. This corresponds to a surface area of around 740 cm$^2$. The PVAc dispersion was applied to the sand surfaces with a brush. The quantity used was around 150 g and thus corresponded to around 2000 g of starting dispersion per square meter of sand surface. After a hardening time of 16 hours at ambient temperature (20 to 25° C.), the sand samples thus treated were stored under the following conditions:

2.1) 4 days at ambient temperature in the laboratory,
2.2) 12 days outdoors with artificial watering (the sand was half-mixed with topsoil)
2.3) 9 days outdoor with rainy days
2.4) 4 days in a conditioning cabinet with ambient air at 10° C.,
2.5) 4 days in a drying cabinet without ambient air at 40° C.

Result: the sand surface obtained in test 2.1 was resilient, i.e. relatively elastic, under relatively strong pressure. The samples stored outdoors in tests 2.2 and 2.3 did not show any significant differences in hardness at the end of the test despite the effect of rain, artificial watering and slight inclination during storage. The hardening of the sand surfaces was generally regarded as very good. In test 2.4, uneven hardening of the sand surface was observed with areas where the surface had not hardened at all. This effect is attributable to the ambient air prevailing in the conditioning cabinet used in this test because it induces extremely rapid drying of the sand surface. By contrast, the sample in test 2.5 (no ambient air) did not show any differences in hardness over the sand surface. On the contrary, the result obtained corresponded to the results obtained in tests 2.2 and 2.3.

3) Other practical tests

The above-mentioned PVAc dispersion with an addition of 5% by weight of triacetin was again used in the form of a 10% by weight solution for these tests.

3.1) Grassing

Sand samples were prepared as in Example 2 but were half-mixed with topsoil (ratio of sand to topsoil 1:1). The sand samples were treated with a PVAc dispersion additionally containing grass seeds. Sand samples containing grass seeds which had not been treated with PVAc dispersion were used as reference. Result: no significant differences were observed in regard to grass growth, growth density and grass color.

3.2) Vinyl acetate content in eluates

A filter nutsche was filled with a layer of sand which was then treated with PVAc dispersion. The hardening time was 16 hours at ambient temperature (20° to 25° C.). A defined quantity of water was then poured onto the layer of sand every day for 10 days and the respective eluate samples (samples 1 to 10) were collected. An eluate which had been obtained from a corresponding untreated layer of sand was used as reference. Sample 9 (i.e. the eluate sample for day 9) was analyzed by head space GC, being spiked with vinyl acetate standard for quantification. The vinyl acetate content determined in this sample was less than 1 ppm.

3.3) COD and TOC values in eluates

The chemical oxygen demand (COD values) and total organic carbon (TOC values) were determined in some of the eluates described above. The COD values were determined in accordance with DIN 38409 H41/1 while the TOC values were determined in accordance with DIN 38409 H3. The eluate samples were stored in a refrigerator (4° C.) pending evaluation. Result:

|  | COD [mg/l] | TOC [mg/l] |
| --- | --- | --- |
| Sample 1 | 92.6 | 31.4 |
| Sample 10 | 4.0* | 2.7 |
| Samples 2 to 8 (average value of the combined samples) | — | 1.8 |
| Reference value 1 | 4.0* | 3.8 |
| Reference value 10 | 1.0* | 1.3 |

*These values are in the range of error of the methods.

The values determined with sample 1 are clearly attributable to the fact that adequate hardening had still not occurred. However, they are by no means critical values. Overall, the values obtained may be described as very positive. In view of this, the COD value of combined samples 2 to 8 was not determined.

3.4) Outdoor tests

For the outdoor tests, areas of around 30 m$^2$ with an inclination of around 60° of loose topsoil and loose sand were sprayed with a PVAc dispersion diluted in a ratio of 1:8 (5% by weight addition of triacetin). The application of around 2 kg of dispersion per square meter was made towards 3.00 pm on a November afternoon. The evaluation was carried out after solidification on the following day, again towards 3.00 pm. Result: despite unfavorable weather conditions (ground mist in the morning, night temperatures around 4° to 6° C.), excellent soil stabilization was obtained and, even after a few days, was still the same.

What is claimed is:

1. A method for the surface stabilization of soil comprising applying a biodegradable aqueous polymer dispersion to a surface layer of soil, said biodegradable aqueous polymer dispersion comprising a polyvinyl acetate polymer and a biodegradable plasticizer member selected from the group consisting of triesters of glycerol with lower aliphatic monocarboxylic acids, citric acid triesters with lower aliphatic monohydric alcohols, epoxidized triglycerides of at least partly olefinically unsaturated fatty acids, and mixtures of two or more of such members.

2. The method as claimed in claim 1 wherein said biodegradable plasticizer member is a triester of glycerol with aliphatic monocarboxylic acids.

3. The method as claimed in claim 2 wherein said aliphatic monocarboxylic acids contain from 2 to 6 carbon atoms.

4. The method as claimed in claim 2 wherein said aliphatic monocarboxylic acids contain from 2 to 4 carbon atoms.

5. The method as claimed in claim 1 wherein said biodegradable plasticizer member is a triester of citric acid with aliphatic monohydric alcohols.

6. The method as claimed in claim 5 wherein said aliphatic monohydric alcohols contain from 2 to 6 carbon atoms.

7. The method as claimed in claim 5 wherein said aliphatic monohydric alcohols contain from 2 to 4 carbon atoms.

8. The method as claimed in claim 1 wherein said biodegradable plasticizer member is a member selected from the group consisting of epoxidized rapeseed oil, epoxidized soybean oil and mixtures thereof.

9. The method as claimed in claim 1 wherein the ratio by weight of solids of said polyvinyl acetate polymer to said biodegradable plasticizer member is from about 3.3:1 to about 50:1.

10. The method as claimed in claim 1 wherein the ratio by weight of solids of said polyvinyl acetate polymer to said biodegradable plasticizer member is from about 5:1 to about 17:1.

11. The method as claimed in claim 1 wherein the ratio by weight of solids of said polyvinyl acetate polymer to said biodegradable plasticizer member is from about 6.25.1 to about 10:1.

12. The method as claimed in claim 1 wherein said aqueous polymer dispersion has a polyvinyl acetate polymer solids content of about 10 to about 65% by weight.

13. The method as claimed in claim 1 wherein said aqueous polymer dispersion has a polyvinyl acetate polymer solids content of about 35 to about 60% by weight.

14. The method as claimed in claim 1 wherein said aqueous polymer dispersion is further comprised of a biodegradable protective colloid.

15. The method as claimed in claim 14 wherein said biodegradable protective colloid is selected from the group consisting of polyvinyl alcohol, starch, and water-soluble starch derivatives.

16. The method as claimed in claim 14 wherein the amount of said biodegradable protective colloid in said aqueous polymer dispersion is limited so that the polyvinyl acetate coating on the soil remains resistant to the effects of weather.

17. The method as claimed in claim 14 wherein the amount of said biodegradable protective colloid in said aqueous polymer dispersion comprises up to about 5% based on the weight of polyvinyl acetate polymer solids in said aqueous polymer dispersion.

18. The method as claimed in claim 14 wherein the amount of said biodegradable protective colloid in said aqueous polymer dispersion is from about 0.5% by weight to about 3% by weight based on the weight of polyvinyl acetate polymer solids in said aqueous polymer dispersion.

19. The method as claimed in claim 1 wherein said biodegradable plasticizer is selected from the group consisting of triacetin, triethyl citrate, acetyl triethyl citrate, tributyl citrate, epoxidized rapeseed oil, and epoxidized soybean oil.

20. The method as claimed in claim 1 wherein said biodegradable plasticizer member comprises a triester of citric acid that is not acylated at its hydroxyl group.

21. The method as claimed in claim 1 wherein said biodegradable plasticizer member comprises a triester of citric acid that is acylated at its hydroxyl group.

22. The method as claimed in claim 21 wherein said triester of citric acid is acylated with a monobasic, saturated carboxylic acid containing 2 to 10 carbon atoms.

23. The method as claimed in claim 1 wherein said biodegradable aqueous polymer dispersion penetrates into said soil to a depth of about 0.5 cm to about 3 cm.

24. The method as claimed in claim 1 wherein said biodegradable aqueous polymer dispersion penetrates into said soil to a depth of about 1 to about 2 cm.

25. The method as claimed in claim 1 wherein said biodegradable aqueous polymer dispersion penetrates into said soil to a depth of less than 1 cm.

26. The method as claimed in claim 1 wherein said soil is sand.

27. The method as claimed in claim 1 wherein said soil is topsoil.

28. A method for the surface stabilization of soil comprising:
applying a biodegradable aqueous polymer dispersion to a surface layer of soil, said biodegradable aqueous polymer dispersion comprising a polyvinyl acetate polymer at a polymer solids content of about 10 to about 65% by weight of said aqueous polymer dispersion and a biodegradable plasticizer member selected from the group consisting of triesters of glycerol with lower aliphatic monocarboxylic acids, citric acid triesters with lower aliphatic monohydric alcohols, epoxidized triglycerides of at least partly olefinically unsaturated fatty acids, and mixtures of two or more of such members, wherein the ratio by weight of solids of said polyvinyl acetate polymer to said biodegradable plasticizer member is from about 3.3:1 to about 50:1.

29. The method as claimed in claim 28 wherein said biodegradable plasticizer at least one biodegradable plasticizer selected from the group consisting of triacetin, triethyl citrate, acetyl triethyl citrate, tributyl citrate, epoxidized rapeseed oil, and epoxidized soybean oil.

30. The method as claimed in claim 29 wherein said aqueous polymer dispersion has a polyvinyl acetate polymer solids content of about 35 to about 60% by weight.

31. The method as claimed in claim 30 wherein the ratio by weight of solids of said polyvinyl acetate polymer to said biodegradable plasticizer member is from about 5:1 to about 17:1.

* * * * *